United States Patent Office 3,198,819
Patented Aug. 3, 1965

3,198,819
STABILIZED ORGANO-STANNOXANES AND PREPARATION THEREOF
Carl R. Gloskey, Stirling, N.J., assignor, by mesne assignments, to M.T. Chemicals Inc., New York, N.Y., a corporation of Delaware
No Drawing. Filed June 29, 1961, Ser. No. 120,504
18 Claims. (Cl. 260—429.7)

This invention relates to a novel technique for stabilization. More specifically, it relates to a technique for stabilizing certain organic distannoxanes, typified by bis (tri-n-butyltin) oxide.

As is well known to those skilled in the art, organic distannoxane compounds typified by bis (tri-n-butyltin) oxide, bis (tri-n-propyltin) oxide, and other hexa-substituted distannoxanes may, on standing, deteriorate to form undesirable by-products, principally precipitates. These precipitates are particularly noticeable when the material has been exposed to ultraviolet light for an extended period of time. In the case of bis (tri-n-butyltin) oxide for example, the precipitate is noted at first as a slight cloudiness. After approximately 30–60 days or more, depending upon the degree of exposure to ultraviolet light, a solid precipitate settles on the bottom of the container. In certain cases, the precipitate may be suddenly formed when the e.g. bis (tri-n-butyltin) oxide is added to the other materials in the process of making various formulations. These precipitates are undesirable in that they may interfere with the clarity of the desired product or they may create the impression in the user that the product is less than pure—a pure product commonly being associated with clarity. Furthermore, any precipitate which is formed indicates that some of the distannoxane is lost.

Although it is not absolutely certain precisely how these precipitates originate, it is thought that they may be formed as a result of a redistribution reaction which may produce e.g. dibutyltin oxide. Other reactions may also occur simultaneously, typically under the influence of ultraviolet light, which produce by-products which may form the precipitate and impart a lack of clarity to the product.

Those skilled-in-the-art have heretofore attempted to eliminate this problem. Various techniques have been tried including addition to the system of various chemicals or attempts to further purify the material as by filtration, distillation, etc. or by controlling the storage conditions, e.g. placing the material in opaque containers and/or storing at lower temperatures. As is apparent, none of these techniques has attained any appreciable degree of success. As a result, it is generally known that the materials are commonly sold in the pure state, free of any additives.

It is an object of this invention to prepare an organic tin compound which has been stabilized against decomposition. It is a further object of this invention to prepare products which retain their stability under exposure to ultraviolet light for extended periods of time. Other objects of this invention will be apparent to those skilled-in-the-art from the following description.

In accordance with certain of its aspects, the method of this invention for stabilizing an organic distannoxane comprises adding to said organic distannoxane a stabilizing amount of an organic carboxylic acid, and heating the mixture so formed.

The organic distannoxanes which may be stabilized by practice of this invention will be compounds containing the grouping

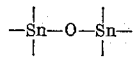

In these compounds, there will be attached to each of the tin atoms three substituents. Most commonly, these substituents may be hydrocarbon groups: alkyl groups, typically methyl, ethyl, propyl, butyl, octyl, dodecyl, etc.; aryl groups typically phenyl, tolyl, etc.; aralkyl groups typically benzyl; cycloalkyl groups, typically cyclohexyl, cyclopentyl, etc. Although the process of this invention can be carried out on distannoxanes where all of the groups attached to the tin atoms are not the same, those compounds which are more commonly available and in connection with which this invention may find its preferred use, will be those wherein all of the groups attached to the tin atoms are the same e.g. hexaalkyl distannoxanes e.g. bis (trialkyltin) oxide and preferably lower alkyl e.g. propyl or butyl stannoxanes. The preferred compound which may be stabilized by practice of this invention will be bis (tri-n-butyltin) oxide wherein, as is apparent, the group attached to the tin atoms is the butyl group. The formula for this compound is $(C_4H_9)_3SnOSn(C_4H_9)_3$.

The invention herein disclosed may also find use in connection with stabilization of certain mono-tin compounds, typified by monostannoxanes such as trimethyltin hydroxide or triphenyltin hydroxide which may, for example, decompose to yield distannoxanes by the typical equation, e.g.

$$2(CH_3)_3SnOH \rightarrow (CH_3)_3Sn\text{—}O\text{—}Sn(CH_3)_3 + H_2O$$

The organic carboxylic acids which may be employed to stabilize the hereinabove noted organic distannoxanes may be monocarboxylic acids, typified by acetic acid, propionic acid, butyric acid, lauric acid, 2-ethylhexoic acid, isoascorbic acid, lactic acid, chloracetic acid, gluconic acid, etc.; dicarboxylic acids typified by malonic acid, succinic acid, etc., tricarboxylic acids typified by citric acid, etc.

Hydroxy-carboxylic acids may be employed, typified by citric acid or lactic acid.

The preferred organic carboxylic acids which may be employed in the practice of this invention may be citric acid, lauric acid and 2-ethylhexoic acid.

The stabilizing amount of these acids which may be employed to effect the desired results may commonly be from 0.1% to 3% by weight of the organic distannoxane being stabilized. If lesser quantities of stabilizer be employed, the results of this invention may be obtained in a lesser degree. Greater quantities of stabilizer may also be employed but no substantial benefit is thereby obtained. The amount of stabilizer required may vary depending upon the particular stabilizer being employed and the distannoxane being stabilized. Most commonly, when using the preferred stabilizers, satisfactory results may be obtained by use of 0.5%–1%, preferably 1% by weight of the distannoxane. In the case of the preferred stabilizer, citric acid, it is possible to obtain the desired results using appreciably smaller quantities than is the case for the other stabilizers. Typically citric acid may be used in amount of 0.5%.

Stabilization may be effected by addition of the stabilizing amount of organic carboxylic acid to the organic distannoxane. The mixture may then be agitated to insure that the stabilizer is uniformly distributed through the body of the organic distannoxane, and then be heated preferably to a temperature which may be at least about 100° C. but below the boiling point of the distannoxane, typically to 100° C.–140° C., say 120° C. for 15–30 minutes, say 30 minutes. During this heating, the requisite reaction for effecting stabilization may occur.

The organic distannoxane which has been stabilized by the addition thereto of a stabilizing amount of an ornic carboxylic acid may be stored for extended periods
of time without attendant deterioration of activity including formation of undesired cloudiness or precipitate.
In typical storage tests, according to this invention, bis
(tri-n-butyltin) oxide containing citric acid has been
stored for periods of up to 130 days without deterioration
as evidenced by development of any precipitate. Under
conditions where the bis (tri-n-butyltin) oxide has been
stored in opaque containers so that it is not contacted
by ultraviolet light, no precipitate has been observed for
periods as long as two years.

For the purposes of giving those skilled in the art a
better understanding of the invention, the following illustrative examples of preferred embodiments are given.
In each of these, various stabilizers falling within the
scope of this invention have been compared in a standard
distannoxane—bis (tri-n-butyltin) oxide.

EXAMPLE 1

In accordance with this example which serves as a control for those which follow, 100 parts of bis (tri-n-butyltin) oxide in a glass container were placed in a window
with a southern exposure and permitted to stand there
over a period of time. Formation of turbidity and precipitate was observed, the results of which are set forth in
the table which follows the examples.

EXAMPLE 2

In a second control example, a sample similar to that
of Example 1 was subjected to ultraviolet radiation for
a period of time. Turbidity and precipitation was observed after various periods of time as noted.

EXAMPLE 3

In a third control example, a sample similar to that
of Example 1 was stored within a steel can for a period
of time and turbidity and precipitation was observed after
various periods of time as noted in the table.

EXAMPLE 4

In this example which illustrates practice of this invention, 1 part of citric acid, an organic carboxylic acid,
was added to 100 parts of bis (tri-n-butyltin) oxide. The
mixture was homogenized by mixing and heating to 120°
C. for 30 minutes. It was then permitted to cool and
after cooling to 20° C., was placed within a transparent
container and stored for the test period.

Additional experiments were conducted according to
the practice of this invention following the pattern of
Example 4. In these subsequent examples, the stabilizer
hereinafter noted was employed in the amount indicated.

| Example No. | Stabilizer | Amount, percent |
|---|---|---|
| 5 | Lauric acid | 1 |
| 6 | do | 3 |
| 7 | 2-ethylhexoic acid | 1 |
| 8 | Isoascorbic acid | 1 |
| 9 | Lactic acid | 1 |

Degree of stabilization was determined by noting the
amount of turbidity and precipitate at the end of various
periods of time. A stabilized product was considered
satisfactory at any given time if the turbidity and/or
precipitate was not apparent to the eye. A sample was
considered unsatisfactory when it was readily apparent
that the material was turbid or that an appreciable amount
of precipitate had formed.

*Table I*

| Example No. | 0 days | 5 days | 10 days | 130 days |
|---|---|---|---|---|
| 1 | 1 | 2 | 3 | 4 |
| 2 | 1 | 2 | 3 | 4 |
| 3 | 1 | 2 | 3 | 4 |
| 4 | 1 | 1 | 1 | 1 |
| 5 | 1 | 1 | 2 | 2 |
| 6 | 1 | 1 | 1 | 1 |
| 7 | 1 | 1 | 1 | 2 |
| 8 | 1 | 1 | 2 | 2 |
| 9 | 1 | 1 | 1 | |

Rating: 1—clear; 2—slight turbidity; 3—moderate turbidity; 4—considerable precipitate.

It will be apparent to those skilled in the art from inspection of the above table that the novel stabilized organic distannoxanes which have been stabilized by addition of stabilizing amounts of organic carboxylic acids
retain their clarity after extended periods of time. In
the case of each of the control examples, the distannoxane,
after only ten days, developed a moderate turbidity which
is considered undesirable by formulators. In the case of
each of Examples 4–9, the samples were rated as 1 or 2,
which is completely satisfactory. In the case of citric
acid and lauric acid, the samples were still completely
clear after 130 days in this comparative test.

It is also a feature of these novel products that they
may have no detrimental effect because of the addition
of these stabilizers. The bactericidal activity is not
decreased. On addition of the stabilized material to
formulations, there is no precipitate as has hereinbefore
been noted.

The novel organic distannoxanes prepared in accordance with the practice of this invention are found to be
stabilized against deterioration over extended periods
of storage. More specifically, these stabilized compounds which may comprise a mixture of an organic
distannoxane and a stabilizing amount of an organic
carboxylic acid, the mixture having been heated, will
be found to be free of turbidity, cloudiness, or precipitate
after extended periods of time. In the case of the preferred embodiment, a mixture of bis (tri-n-butyltin)
oxide containing 0.1%–3.0% of citric acid, the mixture
may be free of turbidity or precipitate after periods of
time which may be as long as 130 days under severe
test conditions. Under normal handling conditions,
commonly found in a plant or a storage warehouse, this
may be equivalent to an equivalent storage life of several
times longer.

Although this invention has been described with reference to specific examples, it will be apparent that
various modifications may be made thereto which fall
within the scope of this invention.

I claim:

1. The method of stabilizing an organic distannoxane
containing the group

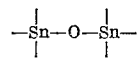

wherein all of the substituents attached to the tin atoms
are hydrocarbon groups against deterioration which comprises adding to said organic distannoxane at least 0.1%
of an organic carboxylic acid, and heating the mixture
so-formed to a temperature of at least about 100° C.
and below the boiling point of said distannoxane.

2. The method of stabilizing an organic distannoxane
against deterioration as claimed in claim 1 wherein said
organic distannoxane is a hexa-substituted distannoxane.

3. The method of stabilizing an organic distannoxane
against deterioration as claimed in claim 1 wherein said
organic distannoxane is a bis (tri-alkyltin) oxide.

4. The method of stabilizing an organic distannoxane
against deterioration as claimed in claim 1 wherein said
organic distannoxane is bis (tri-n-butyltin) oxide.

5. The method of stabilizing an organic distannoxane against deterioration claimed in claim 1 wherein said organic carboxylic acid is selected from the group consisting of acetic acid, propionic acid, butyric acid, lauric acid, 2-ethyl hexoic acid, isoascorbic acid, lactic acid, chloracetic acid, malonic acid, succinic acid, gluconic acid and citric acid.

6. The method of stabilizing an organic distannoxane against deterioration as claimed in claim 1 wherein said organic carboxylic acid is a polycarboxylic acid.

7. The method of stabilizing an organic distannoxane against deterioration as claimed in claim 1 wherein said organic carboxylic acid is a tricarboxylic acid.

8. The method of stabilizing an organic distannoxane against deterioration as claimed in claim 1 wherein said stabilizing amount is 0.1%–3%.

9. The method of stabilizing an organic distannoxane against deterioration as claimed in claim 1 wherein said stabilizing amount is 1% by weight of the organic distannoxane.

10. The method of stabilizing an organic distannoxane containing the group

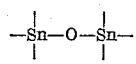

wherein all of the substituents attached to the tin atoms are hydrocarbon groups against deterioration which comprises adding to said organic distannoxane at least 0.1% of an organic carboxylic acid, and heating the mixture so formed to a temperature of 100° C.–140° C.

11. The method of stabilizing bis (tri-n-butyltin) oxide against deterioration which comprises adding to said bis (tri-n-butyltin) oxide at least 0.1% of citric acid, and heating the mixture so formed to a temperature of at least about 100° C. and below the boiling point of said distannoxane.

12. The method of stabilizing bis (tri-n-butyltin) oxide against deterioration which comprises adding to said bis (tri-n-butyltin) oxide 0.1%–3% of citric acid, and heating the mixture so formed to a temperature of at least about 100° C. and below the boiling point of said bis (tri-n-butyltin) oxide.

13. A bis (tri-n-butyltin) oxide stabilized against deterioration which comprises bis (tri-n-butyltin) oxide and 0.1%–3% of citric acid, said mixture having been heated to a temperature of at least about 100° C. and below the boiling point of said distannoxane.

14. An organic distannoxane stabilized against deterioration which comprises a mixture of an organic distannoxane containing the group

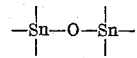

wherein all of the substituents attached to the tin atoms are hydrocarbon groups and at least 0.1% of an organic carboxylic acid, said mixture having been heated to a temperature of at least about 100° C. and below the boiling point of said distannoxane.

15. An organic distannoxane stabilized against deterioration which comprises a mixture of an organic distannoxane containing the group

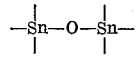

wherein all of the substituents attached to the tin atoms are hydrocarbon groups and 0.1%–3% of an organic carboxylic acid, said mixture having been heated to a temperature of at least about 100° C. and below the boiling point of said distannoxane.

16. A bis (tri-n-butyltin) oxide stabilized against deterioration which comprises a mixture of bis (tri-n-butylin) oxide and at least 0.1% of an organic carboxylic acid, said mixture having been heated to a temperature of at least about 100° C. and below the boiling point of said distannoxane.

17. A bis (tri-n-butyltin) oxide stabilized against deterioration which comprises a mixture of bis (tri-n-butyltin) oxide and 0.1%–3% of an organic carboxylic acid, said mixture having been heated to a temperature of at least about 100° C. and below the boiling point of said distannoxane.

18. A bis (tri-n-butyltin) oxide stabilized against deterioration which comprises bis (tri-n-butyltin) oxide and at least 1.0% of citric acid, said mixture having been heated to a temperature of at least about 100° C. and below the boiling point of said distannoxane.

References Cited by the Examiner

UNITED STATES PATENTS 2,957,785  10/60  Leatherland _____ 260—429.7
3,016,369  1/62   Montermoso et al. ___ 260—429.7

OTHER REFERENCES

Chem. Rev., 60, No. 5, page 503, October 1960, Q.D.-1-A563.

TOBIAS E. LEVOW, *Primary Examiner.*

ABRAHAM H. WINKELSTEIN, *Examiner.*